(No Model.) 2 Sheets—Sheet 1.
H. W. LYON.
METHOD OF MAKING BUTTON STRIP BLANKS.
No. 434,546. Patented Aug. 19, 1890.
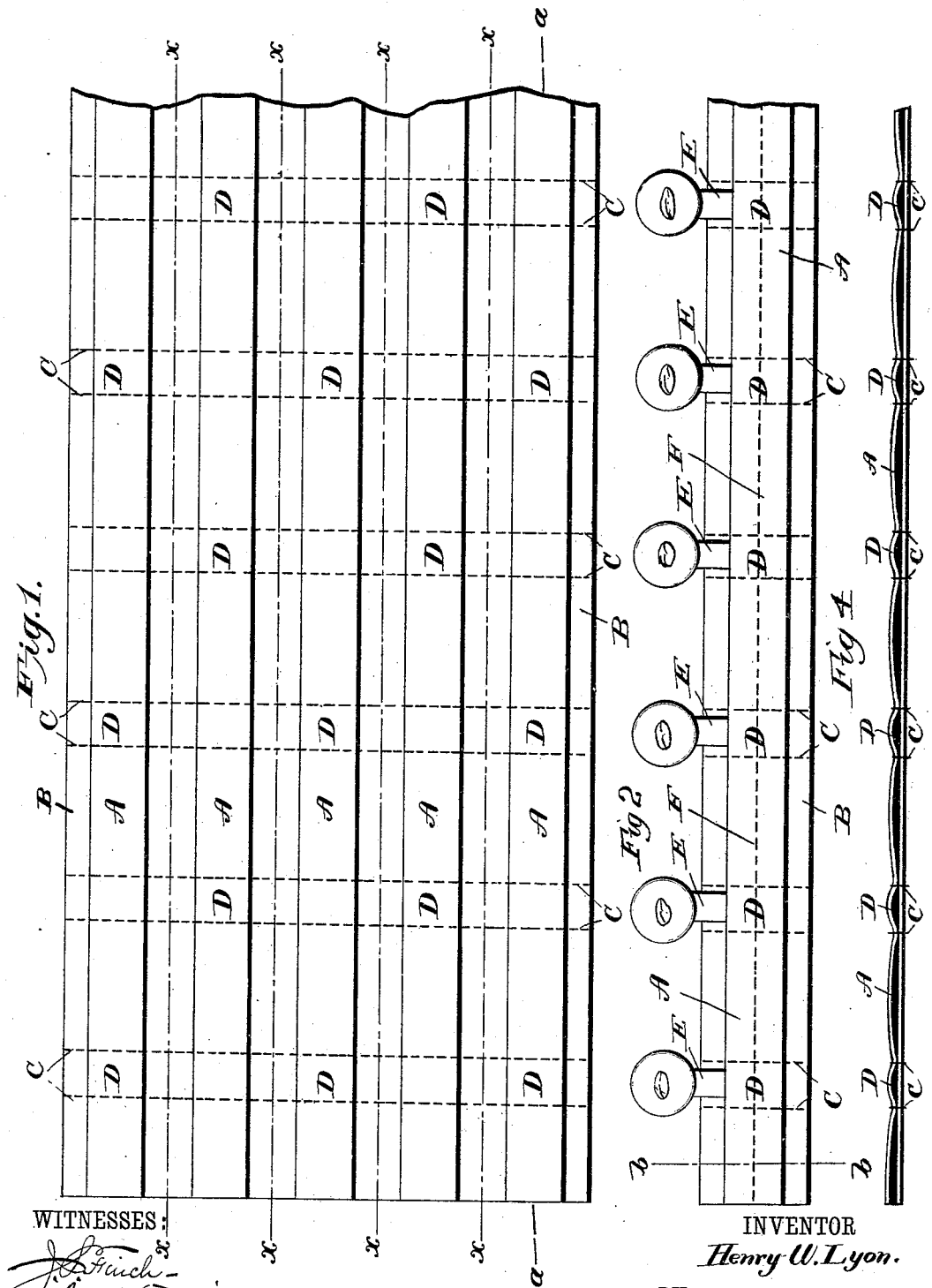
WITNESSES:
INVENTOR
Henry W. Lyon.
BY
ATTORNEY (No Model.)  2 Sheets—Sheet 2.
H. W. LYON.
METHOD OF MAKING BUTTON STRIP BLANKS.
No. 434,546.  Patented Aug. 19, 1890.
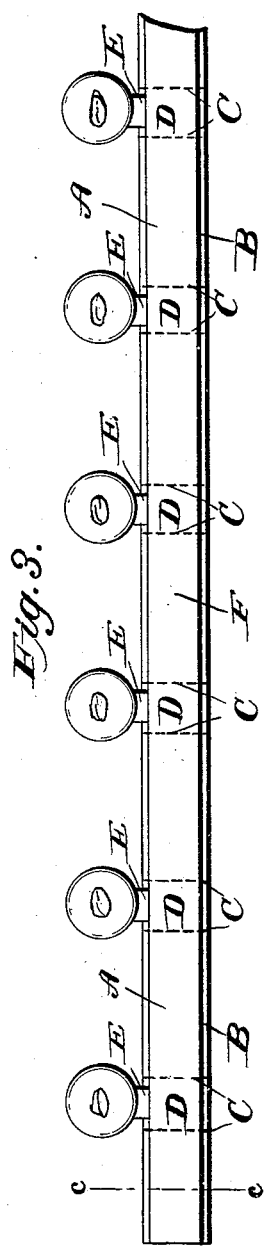
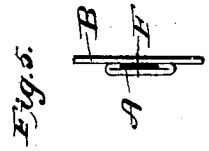
WITNESSES:
INVENTOR
Henry W. Lyon
BY
ATTORNEY

UNITED STATES PATENT OFFICE.

HENRY W. LYON, OF BRIDGEPORT, CONNECTICUT.

METHOD OF MAKING BUTTON-STRIP BLANKS.

SPECIFICATION forming part of Letters Patent No. 434,546, dated August 19, 1890.

Application filed November 16, 1889. Serial No. 330,563. (No model.)

*To all whom it may concern:*

Be it known that I, HENRY W. LYON, a citizen of the United States, residing at Bridgeport, in the county of Fairfield and State of Connecticut, have invented certain new and useful Improvements in the Mode of Making Button-Strip Blanks; and I do hereby declare the following to be a full, clear, and exact description of the invention, such as will enable others skilled in the art to which it appertains to make and use the same.

My invention relates to the mode of making button-strip blanks preparatory to the assembly therein of the button-carrying tapes, and has for its object to cheapen the production of such strips and to afford a durable and exceedingly neat article.

In the accompanying drawings, Figure 1 is a plan illustrating my improved mode of making the strips; Fig. 2, a detail plan of one of the strips with the buttons attached thereto by tapes; Fig. 3, a similar view after the flaps of the base of said strip have been folded underneath; Figs. 4, 5, and 6, sections, respectively, at the lines $a\,a$, $b\,b$, and $c\,c$ in Figs. 1, 2, and 3.

Similar letters denote like parts in the several figures of the drawings.

The strip which I aim to produce is provided with transverse pockets at suitable intervals for the accommodation of the tapes which carry the buttons. I place a series of independent strips A in parallelism upon a common base-strip B and at predetermined distances apart, and stitch said base and strips together by transverse stitches taken at intervals in parallel rows C, each parallel row forming pockets D between the strips A and base B. The series of blanks thus formed are then cut into separate blanks at the lines $x\,x$. The button-carrying tapes E are inserted within the pockets, and secured primarily by a row of stitches F.

Having described my invention, what I claim as new, and desire to secure by Letters Patent, is—

The mode of making button-strip blanks preparatory to the assembly of the button-carrying tapes therein, consisting of placing a plurality of strips in parellelism upon a single base-strip, forming between said strips and base by stitching a series of parallel transverse pockets open at both ends, and finally cutting the product thus formed into separate strips, substantially as set forth.

In testimony whereof I affix my signature in presence of two witnesses.

HENRY W. LYON.

Witnesses:
F. W. SMITH, Jr.,
J. P. FINCH.